US010827409B2

(12) United States Patent
Kim et al.

(10) Patent No.: US 10,827,409 B2
(45) Date of Patent: Nov. 3, 2020

(54) METHOD AND APPARATUS FOR IMPROVING MOBILITY IN WIRELESS COMMUNICATION SYSTEM

(71) Applicant: Samsung Electronics Co., Ltd, Gyeonggi-do (KR)

(72) Inventors: Sunghoon Kim, Gyeonggi-do (KR); Sung Hwan Won, Seoul (KR); Hwajin Cha, Gyeonggi-do (KR); Songyean Cho, Seoul (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 257 days.

(21) Appl. No.: 15/275,279

(22) Filed: Sep. 23, 2016

(65) Prior Publication Data

US 2017/0094577 A1 Mar. 30, 2017

(30) Foreign Application Priority Data

Sep. 24, 2015 (KR) .................. 10-2015-0135873

(51) Int. Cl.
*H04W 36/38* (2009.01)
*H04W 36/00* (2009.01)
(Continued)

(52) U.S. Cl.
CPC ....... *H04W 36/38* (2013.01); *H04W 36/0088* (2013.01); *H04W 36/08* (2013.01);
(Continued)

(58) Field of Classification Search
CPC combination set(s) only.
See application file for complete search history.

(56) References Cited

U.S. PATENT DOCUMENTS

| 8,509,163 B2 | 8/2013 | Guo et al. |
| 2010/0046476 A1* | 2/2010 | Qiu .................. H04W 36/02 370/331 |

(Continued)

FOREIGN PATENT DOCUMENTS

| CN | 101754174 A | 6/2010 |
| CN | 102281586 A | 12/2011 |
| KR | 20140078675 A | 6/2014 |

OTHER PUBLICATIONS

Foreign Communication From a Related Counterpart Application, PCT Application No. PCT/KR2016/010657, International Search Report dated Jan. 6, 2017, 3 pages.

(Continued)

*Primary Examiner* — Steven S Kelley

(57) ABSTRACT

The present disclosure relates to a communication method and system for converging a 5 th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

A method for a base station to perform communication in a wireless communication system includes transmitting an interface setup request message related to tracking area information to at least one mobility management entity (MME) in a first MME pool. The method includes identifying whether an interface setup response message related to the tracking area information is received from the at least one MME in the first MME pool, and storing mapping (Continued)

information between the tracking area information and the first MME pool if the interface setup response message is received.

14 Claims, 7 Drawing Sheets

(51) Int. Cl.
    *H04W 36/14*      (2009.01)
    *H04W 8/06*      (2009.01)
    *H04W 36/12*      (2009.01)
    *H04W 60/00*      (2009.01)
    *H04W 36/08*      (2009.01)

(52) U.S. Cl.
    CPC ........... *H04W 36/14* (2013.01); *H04W 60/00* (2013.01); *H04W 8/065* (2013.01); *H04W 36/12* (2013.01)

(56) References Cited

U.S. PATENT DOCUMENTS

| | | | |
|---|---|---|---|
| 2010/0080186 A1* | 4/2010 | Guo | H04W 28/08 370/329 |
| 2011/0096721 A1 | 4/2011 | Kamalaraj et al. | |
| 2011/0171979 A1 | 7/2011 | Rune | |
| 2011/0306363 A1 | 12/2011 | Wang et al. | |
| 2012/0039299 A1* | 2/2012 | Teyeb | H04B 7/2606 370/331 |
| 2012/0252436 A1* | 10/2012 | Ostrup | H04W 60/00 455/422.1 |
| 2013/0100813 A1 | 4/2013 | Velamati et al. | |
| 2013/0150047 A1 | 6/2013 | Zhang et al. | |
| 2014/0051442 A1* | 2/2014 | Yang | H04W 36/12 455/436 |
| 2014/0148176 A1 | 5/2014 | Raaf et al. | |
| 2015/0257180 A1* | 9/2015 | Liu | H04L 41/0803 455/452.1 |
| 2016/0255492 A1* | 9/2016 | Kilgour | H04W 8/02 455/435.1 |
| 2017/0311150 A1 | 10/2017 | Zhang et al. | |

OTHER PUBLICATIONS

Office Action dated Aug. 5, 2020 in connection with Chinese Patent Application No. 201680055225.4, 17 pages.

* cited by examiner

METHOD AND APPARATUS FOR IMPROVING MOBILITY IN WIRELESS COMMUNICATION SYSTEM

CROSS-REFERENCE TO RELATED APPLICATION(S) AND CLAIM OF PRIORITY

The present application is related to and claims the benefit of priority under 35 U.S.C. § 119(a) of Korean Patent Application No. 10-2015-0135873, filed on Sep. 24, 2015, which is hereby incorporated by reference for all purposes as if fully set forth herein.

TECHNICAL FIELD

The present disclosure relates to a method and an apparatus for improving mobility in a wireless communication system.

BACKGROUND

In general, a mobile communication system was developed for the purpose of providing a voice service while securing user's mobility. However, the area of the mobile communication system has been expanded gradually to a data service in addition to a voice service, and, at present, the mobile communication system has been developed to the extent of being capable of providing a high-speed data service. However, in the mobile communication system that is currently providing a high-speed data service, since resources are short and users demand a higher-speed service, there has been a need for a greatly developed mobile communication system. To cope with such a need, standardization of a Long Term Evolution (LTE) system in the 3rd Generation Partnership Project (3GPP) is currently underway as one of the next-generation mobile communication systems. The LTE is technology that implements high speed packet based communication having the maximum transmission speed of about 100 Mbps.

A wireless access network of an LTE mobile communication system includes User Equipment (UE), an evolved Node B (eNB, hereinafter also referred to as "base station", "RAN node", or "Node B"), a Mobility Management Entity (MME) that is called a core network node, a Serving Gateway (S-GW), a Packet Data Network Gateway (PDN-Gateway or P-GW), an Application Function (AF), and a Policy Control and Charging Rules Function (PCRF). The wireless access network may further include a Universal Terrestrial Radio Access Network (UTRAN), a GSM Edge Radio Access Network (GERAN), a Serving GPRS Support Node (SGSN), and a Home Subscriber Server (HSS), or may be connected to such entities/systems.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

To address the above-discussed deficiencies, it is a primary object to provide a method and an apparatus for connecting User Equipment (UE) to a specific Mobile Management Entity (MME) pool in accordance with an area where one evolved Node B (eNB) provides a service when the one eNB is connected to two or more non-overlapping MME pools. Further, another aspect of the present disclosure proposes a method and an apparatus for performing an intra-eNB inter-MME handover when the UE that is connected to the eNB moves to an area that is related to another MME pool.

In accordance with an aspect of the present disclosure, a method for a base station to perform communication in a wireless communication system includes transmitting an interface setup request message related to tracking area information to at least one mobility management entity (MME) in a first MME pool; identifying whether an interface setup response message related to the tracking area information is received from the at least one MME in the first MME pool; and storing mapping information between the tracking area information and the first MME pool if the interface setup response message is received.

In accordance with another aspect of the present disclosure, a base station includes a transceiver unit configured to transmit or receive signals; and a control unit configured to transmit an interface setup request message related to tracking area information to at least one mobility management entity (MME) in a first MME pool, to identify whether an interface setup response message related to the tracking area information is received from the at least one MME in the first MME pool, and to store mapping information between the tracking area information and the first MME pool if the interface setup response message is received.

As described above, in a situation where one eNB is connected to two or more non-overlapping MME pools, there may be RAN sharing that shares eNB resources. Further, in a cloud RAN environment that becomes conspicuous as the next-generation technology, since one logical eNB manages several Radio Units (RUs), the one eNB can cover a wider area, and thus it can be connected to several non-overlapping MME pools. In the above-described situation, it is possible to connect User Equipment (UE) to another MME pool in accordance with the location of the UE based on the mobile communication service provider's policy. As effects according to the present disclosure, an MME in a specific area can allocate an S-GW or P-GW that is located close to the specific area to UE in the specific area, and this can be used for the UE to achieve processing of a large amount of data, reduction of a delay, and providing of a high-quality LTE service. Further, it becomes possible to manage UEs in a congested area into which users are crowded.

In other words, through addition of a specific MME to the best tourist resort (seashore in the summer season) or a place (sports ground or citizen plaza) in which periodic events occur, it becomes possible to reduce signaling overload occurring in the MME, S-GW, or P-GW that manages the outskirts of an area into which users are abruptly crowded and to enable the UE in the congested area to maintain the service quality over a predetermined level through allocation of a specific S-GW or P-GW to the UE in the corresponding area through the specific MME.

Further, through temporary addition of an MME, S-GW, or P-GW to a specific area, it is possible to make a mobile communication network in normal conditions and a mobile communication network in specific situations operate in different manners. For example, by adding the MME, S-GW, or P-GW around the World Cup Stadium during the period in which the World Cup is held, a high-quality LTE service can be provided. Since it may be inefficient in network management and cost to install and maintain network equipment constantly and usually in a retired place, the above-described scenario has efficiency.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
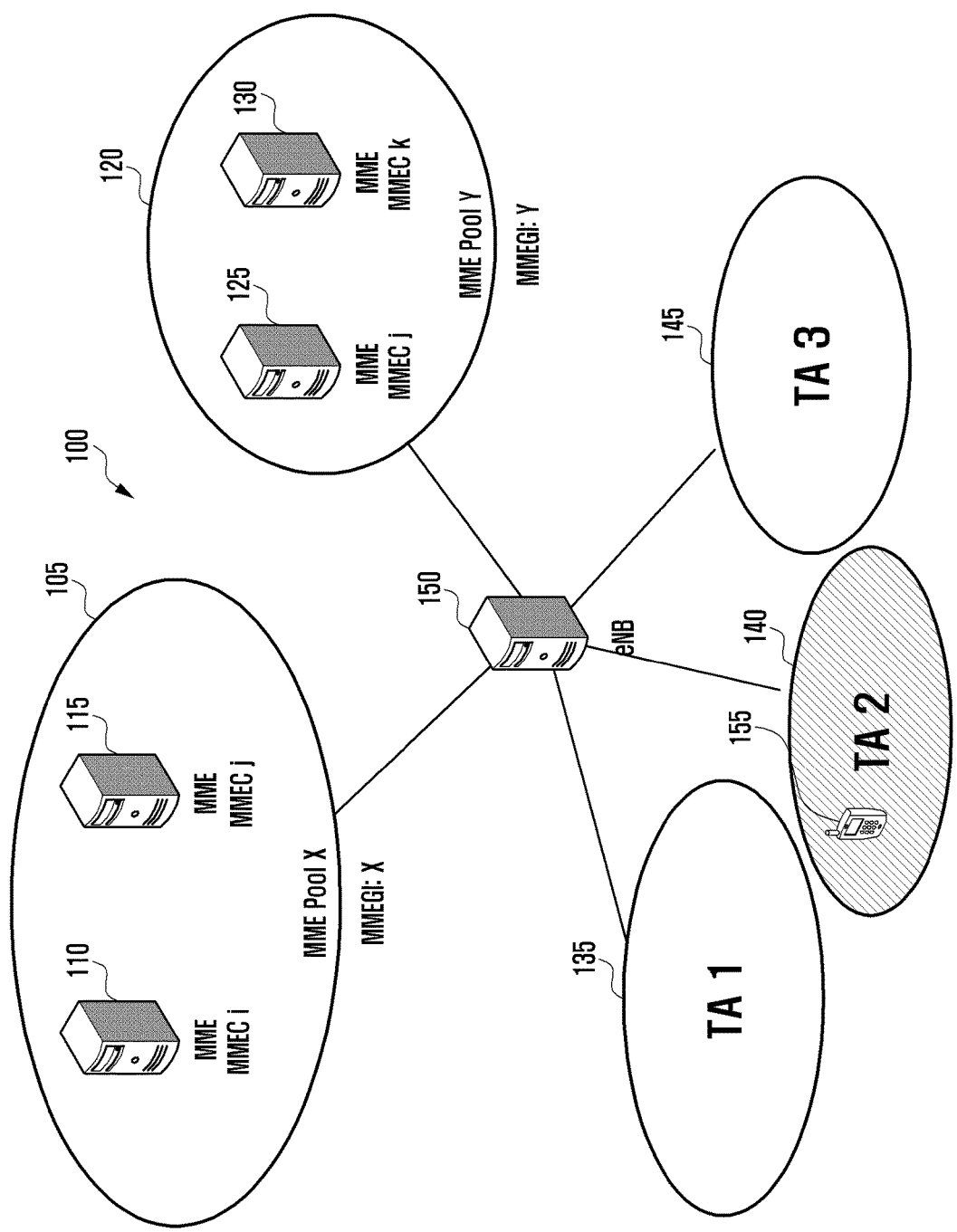
FIG. 1 illustrates S1 connection between an eNB and MME pools according to an embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, embodiments of the present disclosure will be described in detail with reference to the accompanying drawings. In describing the present disclosure, related well-known functions or configurations incorporated herein are not described in detail in the case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined on the basis of the contents of the whole description of the present disclosure.

Further, in describing embodiments of the present disclosure in detail, a wireless connection network that is standardized by the 3rd Generation Partnership Project (3GPP), Long Term Evolution (LTE) that is a core network, and an Evolved Packet Core (EPC) will be the main subjects. However, the main subject of the present disclosure can be applied to other communication systems adopting similar technical backgrounds with slight modifications within a range that does not greatly deviate from the scope of the present disclosure, and this would be possible according to the judgment of a person skilled in the art to which the present disclosure pertains.

According to an embodiment of the present disclosure, an eNB is connected to an MME to manage mobility of UE, and this is called S1 connection. The MME is the pivot that manages the mobility of the UE, and serves to relay a connection between the eNB and an S-GW/P-GW. A control signal of the UE is transmitted to the MME through the eNB. If needed, the MME may negotiate with the S-GW/P-GW to process the control signal. A data signal of the UE is transmitted to the S-GW/P-GW through the eNB. In order to manage the movement area of the UE and to control signaling congestion, MMEs operate as an MME pool.

The MMEs in the same pool manage an MME pool area that is supported by the corresponding pool in the unit of a tracking area, and provide services to the UE in the corresponding area. If a tracking area that is supported by one MME pool is unable to be supported by another MME pool, the two MME pools may be called non-overlapping MME pools. Unlike this, if a tracking area that is supported by one MME pool is also supported by another MME pool, the two MME pools may be called overlapping MME pools, and an overlapping MME pool itself, which is constituted by two MME pools, becomes a non-overlapping MME pool that does not overlap another MME pool that is different from the two MME pools. The eNB can support several tracking areas, and support mobility in the unit of cells that are obtained by dividing the tracking area into several cells. In order to discriminate tracking areas to which the respective cells belong, the eNB may manage the tracking area in association with an identification code for the tracking area, for example, a Tracking Area Code (TAC).

An embodiment of the present disclosure provides a method and an apparatus for connecting UE to a specific MME pool in accordance with an area where one eNB provides a service when the one eNB is connected to non-overlapping MME pools. Further, the present disclosure proposes a method and an apparatus for performing an intra-eNB inter-MME handover when the UE that is connected to the eNB moves to an area that is related to another MME pool.

According to various embodiments of the present disclosure, it is possible that one eNB is connected to one or more non-overlapping MME pools. The MME pools can be discriminated through MME Group IDs (MMEGI). According to the current standards, an MME Code (MMEC) that discriminates the MME is unique in one non-overlapping MME pool, that is, one MMEGI. The eNB identifies one MME with the MMEGI and the MMEC. Accordingly, the eNB that is connected to two or more non-overlapping MME pools is unable to discriminate what non-overlapping MME pool the MME belongs to using the MMEC only.

When the UE transmits an RRC message to the eNB in order to be connected to the eNB, the UE uses an identifier that is called an SAE Temporary Mobile Subscriber Identity (S-TMSI), and this is an ID allocated by the MME to identify the UE. The S-TMSI is composed of the MMEC and an MME Temporary Mobile Subscriber Identity (M-TMSI). The eNB, which has received an RRC connection request message that includes the S-TMSI from the UE, grasps what MME it should be connected to through the MMEC of the S-TMSI. However, the eNB that is connected to two or more non-overlapping MME pools does not know what non-overlapping MME pool the MME, which is uniquely indicated by the MMEC, belongs to. If one MME pool is in a congested state and thus it is unable to expropriate the UE's connection request, the MME may notify the eNB of an overload state, and the eNB may reject the UE's control signal for the corresponding MME. In this case, the eNB is unable to grasp whether the MME is overloaded through the MMEC of the S-TMSI, and may reject the control signal although the UE is connected to the MME pool that is not congested.

As described above, the current setting between the eNB and the MME pool may cause malfunction between the UE and the MME. Accordingly, if the UE recognizes the MMEGI that should be connected in an area where the UE currently exists using a tracking area code for the corresponding area, the eNB can grasp an appropriate MME using the location of the UE and the MMEC. The above-described setting does not violate the standard, and may be implemented according to the policy of an enterpriser that operates a wireless communication network.

Further, in a situation where one eNB is connected to two or more non-overlapping MME pools, there may be RAN sharing that shares eNB resources representatively. Further, in a cloud RAN environment that becomes conspicuous as the next-generation technology, since one logical eNB manages several Radio Units (RUs), the one eNB can cover a wide area, and thus it can connect UE to another MME pool according to the location of the area and the policy. Further, in the case of a congested area in which specific events occur or users are periodically crowded, the MME, S-GW, or P-GW, which manages not only the corresponding area but also peripheral areas, becomes congested since it is required to process data that is abruptly increased in comparison to data in normal conditions, and thus service quality for users around the corresponding area may deteriorate. In the case where congested situations are expected, according to the present disclosure, a specific MME allocates a specific S-GW or P-GW to the UE in the area to maintain the service quality over a predetermined level with respect to the UE in the congested area and the UE around the congested area.

In the case where a connected terminal moves in one eNB, an intra-eNB handover occurs since the eNB is the same, and in this case, interaction between the eNB and the MME may be skipped. However, in the case where one eNB is connected to two or more MME pools as described above and an area to which a connected UE has moved is a place that should be connected to another MME pool, that is, in the case where a target TAC is a place that should be connected to another MME pool that is different from the MME pool connected to a source TAC with respect to a connected UE that has moved from the source TAC to the target TAC, a handover occurs within the eNB, but an intra-eNB inter-MME handover should be performed since the MME should be changed.

If the inter-MME handover is not performed, the MME that is connected to the target TAC is unable to receive context of the UE that is in the MME connected to the source TAC, and thus the MME is unable to recognize the UE and transfers a tracking area update reject to the UE when the UE performs tracking area update after the handover is completed. After receiving the tracking area update reject, the UE performs disconnection and requests a connection from a network again. This may cause service interruption to occur with respect to the user and may cause inefficient signaling to occur in the network. Accordingly, there is a need for a method for a connected UE that has moved to a TAC connected to another MME pool to perform an intra-eNB inter-MME handover.

FIG. 1 illustrates the structure of a wireless communication system 100 according to an embodiment of the present disclosure.

In the above drawing, MME means a mobility management entity. In order to manage the movement area of UE and to control signaling congestion, MMEs operate as MME pools 105 and 120 that are groups of MMEs 110, 115, 125, and 130. The MME pools 105 and 120 are discriminated by MME Group Identities (MMEGI). The MMEs having the same MMEGI can be discriminated by MME Codes (MMEC).

As illustrated in FIG. 1, the MMEC is unique with respect to the same MMEGI, and thus MMEGI X 105 and MMEGI Y 120 may have MMEC j 115 and 1215 having the same MMEC value. The MMEs that are in the same pool manage areas that are supported by the corresponding pool in the unit of Tracking Areas (TA) 135, 140, and 145, and provide services to UE 155 that is in the corresponding area. If the tracking area that is supported by one MME pool is unable to be supported by another MME pool, the two MME pools become non-overlapping MME pools. For example, in FIG. 1, TA 1 135 becomes a tracking area supported by MMEGI Y 120, but becomes an area that is not supported by MMEGI X 105. Accordingly, MMEGI X 105 and MMEGI Y 120 become non-overlapping MME pools. The eNB may support several tracking areas, and in order to discriminate the tracking areas, it manages the tracking areas in association with Tracking Area Codes (TAC).

The present disclosure proposes a method and an apparatus for causing an eNB 150 to discriminate MMEGI that should be connected in the corresponding area using a tracking area code for an area where UE 155 currently exists, and to grasp an appropriate MME using the location of the UE and MMEC. An embodiment of the present disclosure proposes a method for using S1 connection setup between the eNB and the MME in association with the MMEGI based on the TAC. Although the present disclosure describes the methods with respect to the TAC and the MMEGI, it is apparent that the TAC can be replaced by another identifier that indicates an area for serving the UE and the MMEGI can be replaced by another identifier that indicates an MME pool.

In general, the eNB 150 has settings for the MME to which the eNB itself should establish S1 connection. The eNB may send S1 setup request to all MMES or may sent S1 setup to parts of MMEs in accordance with implementation of a mobile communication network operator. The eNB constructs and transmits S1 setup request message to the MME, and in this case, the message may include a global eNB ID as the identifier of the eNB and may further include an eNB name. The S1 setup request message includes information on TAs that are supported by the eNB 150 (supported TAs: composed of PLMN ID+TAC).

The MME that has received this checks information on TAs 135, 140, and 145 that are supported by the eNB 150, and if TA that is supported by the MME itself is included therein, the MME constructs an S1 setup response message and transmits PLMN IDs, MMEGIs, and MMECs. However, the MME does not transfer the S1 setup response for the TAs that are included in the S1 setup request by the eNB 150, but provides the PLMN IDs, MMEGIs, and MMECs that are supported by the MME as one list. Accordingly, the eNB 150 does not know the PLMN ID, MMEGI, and MMEC for a specific TA.

The eNB 150, which has performed the above-described procedure with one or more MMEs, does not know the PLMN ID, MMEGI, and MMEC that correspond to a specific TA, but knows the PLMN IDs, MMEGIs, and MMECs that are supported by all S1-connected MMEs with respect to all the supported TAs 135, 140, and 145. That is, the eNB 150 does not know the PLMN ID, MMEGI, or MMEC for a specific TA, but decides that all combinations of PLMN IDs, MMEGIs, and MMECs are supported with respect to the TAs 135, 140, and 145 that are supported by the eNB itself.

For example, in FIG. 1, although TA 1 135 and TA 3 145 are supported by MMEGI X 105 and TA 2 140 is supported by MMEGI Y 120 only, the eNB 150 sets that the eNB itself supports MMEGI X, MMEGI Y, MMEC i, MMEC j, and MMEC k with respect to TA 1, TA 2, and TA 3 as the result of the S1 setup procedure. Accordingly, in order to establish the S1 setup that can discriminate MMEGIs for the TAs, the present disclosure proposes the following method.

Figure 2:
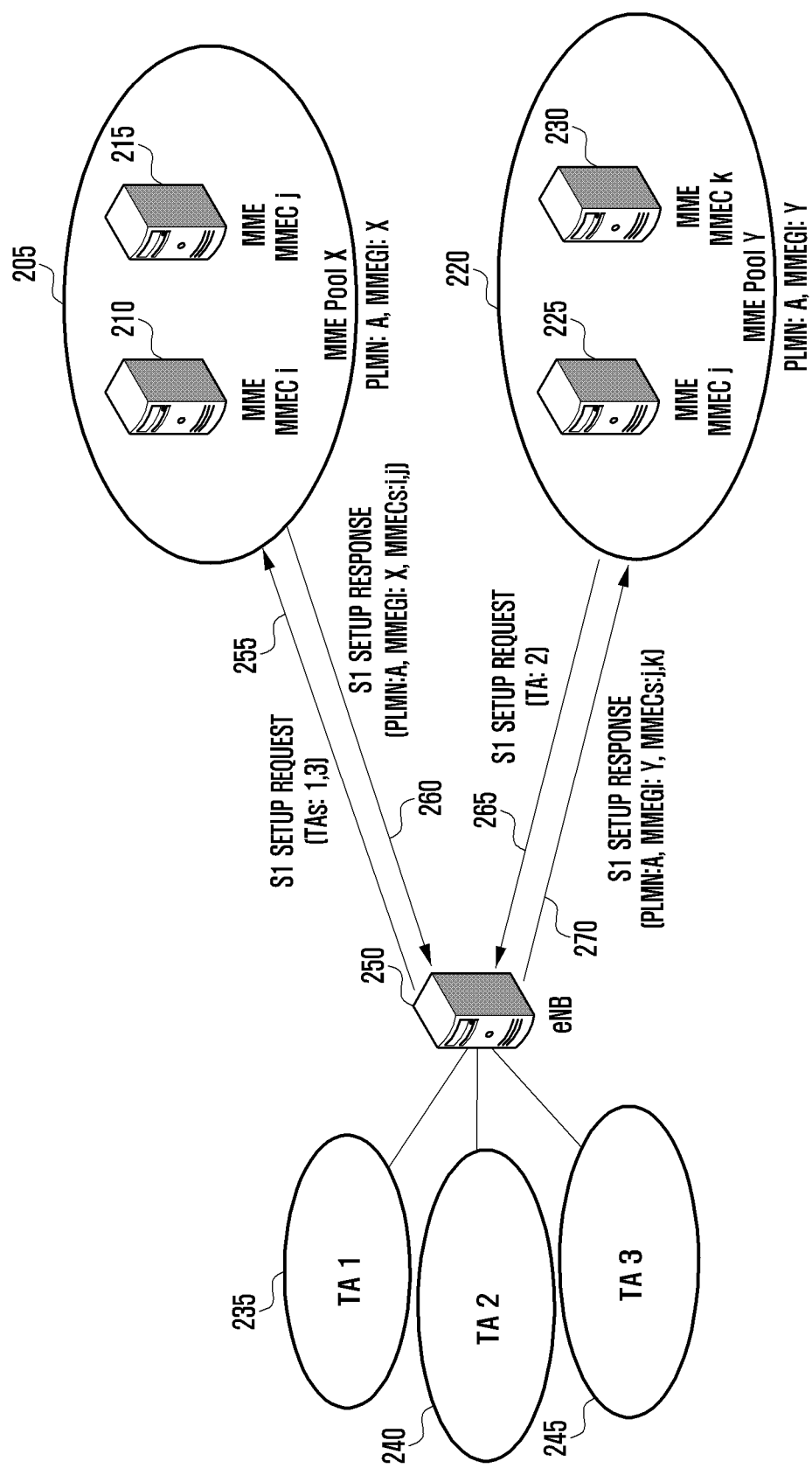
FIG. 2 illustrates an example that an eNB sets up S1 connection with an MME so as to have a mapping relationship between a tracking area and an MME pool according to an embodiment of the present disclosure.

FIG. 2 illustrates a first method for causing an eNB to set up S1 connection with an MME so that the eNB has a mapping relationship between TAC and MMEGI according to an embodiment of the present disclosure.

In the description, the term "mapping" may include at least one of meanings of allocation/storage/writing of certain information in an empty space (e.g., resource mapping), confirmation of a relationship between information A and information B, and confirmation of separate mapping information that indicates existence/nonexistence of the mapping information.

Referring to FIG. 2, an eNB 250 may have already set values for S1 setup with any MME (or MME pool) with respect to any TA. The set values may be decided by a mobile communication network service provider from the operating side. Since TA is discriminated by TAC, TAC called in the description may mean TA in the drawing.

FIG. 2 expresses a procedure based on an example in which the eNB 250 has the above-described set values. The eNB 250 has been preset to send S1 setup request 255 to MMEs 210 and 215 existing in MMEGI X 205 with respect to TA 1 235 and TA 3 245. Further, the eNB 250 has been preset to send S1 setup request 265 to MMEs 225 and 230 existing in MMEGI Y 220 with respect to TA 2 240. Accordingly, when establishing the MME and S1 setup, the eNB 250 transmits an S1 setup request message that includes only a preset TA value to a target MME. Accordingly, the S1 setup request 255, in which TA 1 235 and TA 3 245 are included as supported TA information elements according to the set values, is transferred to the MMEs 210 and 215 existing in MMEGI X 205. In the same manner, the S1 setup 265, in which TA 2 240 is included as a supported TA information element according to the set values, is transferred to the MMEs 225 and 230 existing in MMEGI Y 220.

The eNB 250, which has received S1 setup responses 260 and 270 from the respective MMEs, can know MMEGI and MMEC that match the supported TAs of the S1 setup requests 255 and 265 that are sent by the eNB itself, and stores mapping information for the corresponding TAC and MMEGI. For example, TAC 1 for TA1 235 and TAC 3 for TA3 245 are mapped into MMEGI X 205 and TAC 2 for TA2 240 is mapped into MMEGI Y 220 to be stored.

Accordingly, the eNB 250 according to this embodiment can grasp the MMEGI for the corresponding area information in accordance with the TAC that is area information to which the UE has sent a connection request or a message. Further, since MMEC is unique in the MMEGI, the eNB can discriminate the MME of the corresponding MMEGI in accordance with the MMEC of S-TMSI that is sent by the UE of the specific TAC. Further, in expansion, the eNB may store the mapping information in the form of TAC and MMEGI+MMEC.

Figure 3:
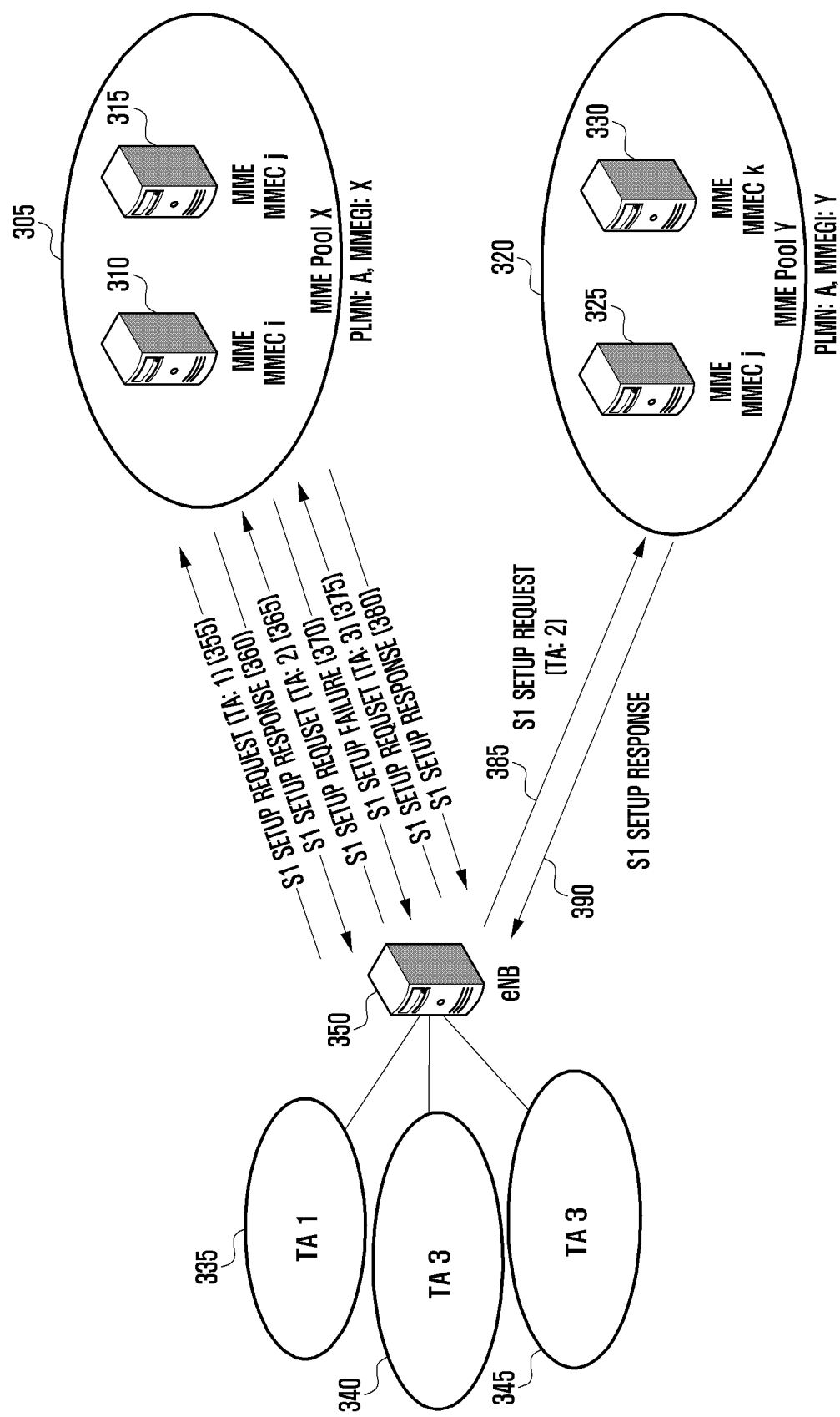
FIG. 3 illustrates an example that an eNB sets up S1 connection with an MME so as to have a mapping relationship between a tracking area and an MME pool according to an embodiment of the present disclosure.

FIG. 3 illustrates a second method for causing an eNB to set up S1 connection with an MME so that the eNB has a mapping relationship between TAC and MMEGI according to an embodiment of the present disclosure.

In this embodiment, an eNB 350 does not have set values for S1 setup with any MME with respect to any TA. Accordingly, in order to know the MME that supports a specific TA with respect to the TA that is supported by the eNB itself, the eNB 350 may transmit an S1 setup request message, of which one TA is put in the supported TA, to the respective MMEs one by one.

For example, referring to FIG. 3, in the case where the eNB 350 supports TA 1 335, TA 2 340, and TA 3 345, the eNB 350 may first send S1 setup request message 355, in which TA 1 335 is set as the supported TA, to MMEs 310 and 315 that correspond to MMEGI X 305. In this case, the eNB 350 may first send the S1 setup request message to MMEs 325 and 330 that correspond to MMEGI Y 320. If the MME supports TA 1 335, it may respond to the eNB 350 through sending of an S1 setup response 360 thereto, while if the MME does not support TA 1 335, it may respond to the eNB 350 through sending of an S1 setup failure (not illustrated) thereto.

As shown in FIG. 3, since the MMEs 310 and 315 that exist in MMEGI X 305 support TA 1 335 and TA 3 345, they may respond to the S1 setup requests 355 and 375 that include TA 1 335 and TA 3 345 through sending of MMEGI and MMEC to the respective S1 setup responses 360 and 380. However, since they do not support TA 2 340, they may send S1 setup failure 370 in response to the S1 setup request 365.

In various embodiments, the eNB 350 may attempt to perform the above-described process to the MMEs 325 and 330 of the MMEGI Y 320 with respect to all the TAs 335, 340, and 345 supported by the eNB itself. Further, since the eNB 350 can know that TA 1 335 and TA3 345 are supported by MMEGI X 305 through the above-described process, the eNB 350 may send S1 setup request 385 to the MMEs 325 and 330 of MMEGI Y 320 only with respect to TA 2 340 that is the remaining Ta, and in response to this, the eNB 350 may receive S1 setup response 390 that includes MMEGI and MMEC.

In the above-described example, if the MMEGI, to which the eNB 350 first sent the S1 setup request, is not MMEGI X 305, but is MMEGI Y 320, it is apparent that the eNB 350 can send again the S1 setup request to the MME of MMEGI X 305 only with respect to the TAs that have received failure responses to the S1 setup request that was sent to MMEGI Y 320.

For example, in this example, the eNB 350 may map TAC 1 335 and TAC 3 345 into MMEGI X 305 and may map TAC 2 340 into MMEGI Y 320 to store them. Thereafter, the eNB 350 can grasp the MMEGI for the corresponding area information in accordance with the TAC that is area information to which the UE has sent a connection request or a message. Further, the eNB can discriminate the MME of the corresponding MMEGI in accordance with the MMEC of S-TMSI that is sent by the UE. Since the MMEC is unique only in the MMEGI, it is not proper to independently use the MMEC as the mapping information, and the MMEC may be stored in the form of TAC and MMEGI+MMEC.

Figure 4:
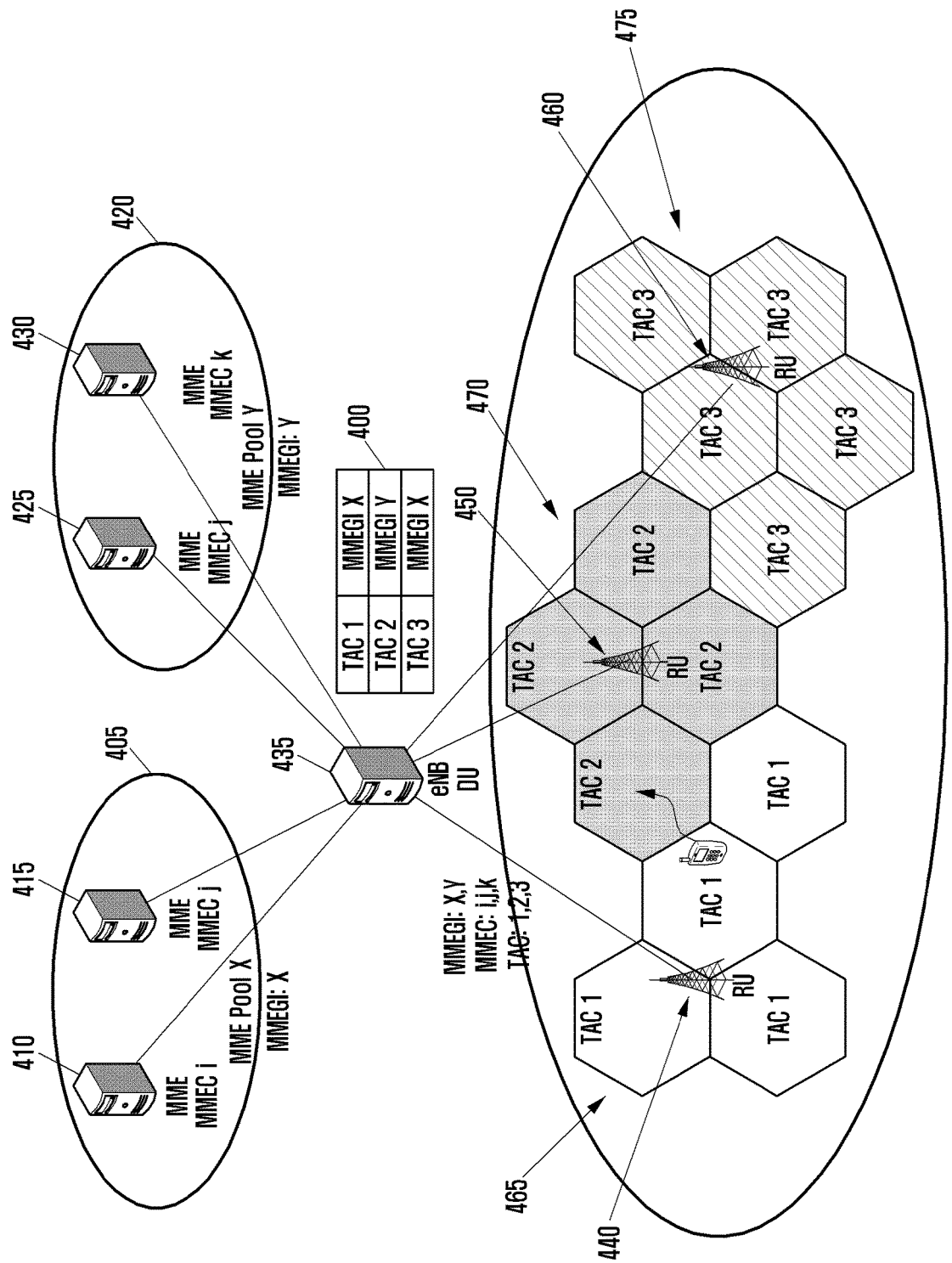
FIG. 4 illustrates a structure in which an eNB completes an S1 setup procedure with an MME and stores a mapping table between a Tracking Area Code (TAC) and an MME Group ID (MMEGI) according to an embodiment of the present disclosure.

FIG. 4 illustrates a network structure according to the results of FIGS. 2 and 3. DU 435 of an eNB illustrated in FIG. 4 means a Digital Unit, that is, a device that can be digitally processed among constituent elements of the eNB, and RUs 440, 450, and 460 mean Radio Units, that is, wireless devices (antenna, modulator, and the like) for radio wave transmission/reception among constituent elements of the eNB.

The eNB supports several TAs 465, 470, and 475, and discriminates the respective TAs by identifiers that are TACs. Further, each TA is composed of several cells. In accordance with the results of FIGS. 2 and 3, the eNB (for convenience, DU is hereinafter referred to as "eNB") 435 stores therein mapping information, in which, for example, TAC 1 465 is related to MMEGI X 405, TAC 2 470 is related to MMEGI Y 420, and TAC 3 475 is related to MMEGI X 405, as in table 400. The eNB 435 may have different structures having the mapping information, and the present disclosure may include any structure that can discriminate specific MME pools 405 and 420 and MMES 410, 415, 425, and 430 using TACs.

When the UE sends a connection request or a message, the eNB 435 according to an embodiment of the present disclosure can discriminate the MMEGI in accordance with the TAC of the UE. For example, TAC information that corresponds to a cell may be preset, and thus the MMEGI may be confirmed on the basis of the TAC to which the cell, to which connection is requested by the UE, belongs.

Further, the eNB 435 may decide a handover based on a measurement report sent by the UE, and in this case, the eNB 435 may grasp whether the current MMEGI is equal to or different from the MMEGI when being moved to a target cell in accordance with the TAC to which the target cell belongs. Further, the eNB 435 may broadcast MMEGI having its own 51 connection, MMEC, and supported TAC to the UE as system information.

That is, according to this embodiment, the eNB can discriminate the MMEGI that should be connected in an area where the UE currently exists using an identifier for the corresponding area, and thus can grasp an appropriate MME using the location of the UE and the MMEC.

In the above-described situation, the eNB can connect the UE to another MME pool in accordance with the location of the UE based on the mobile communication service provider's policy. Based on this, an MME in a specific area can allocate an S-GW or P-GW that is located close to the area to the UE in the specific area, and this can be used for the UE in the area to achieve processing of a large amount of data, reduction of a delay, and providing of a high-quality LTE service. Further, it becomes possible to manage the UE in a congested area into which users are crowded.

According to an embodiment of the present disclosure, through addition of a specific MME to the best tourist resort (seashore in the summer season) or a place (sports ground or citizen plaza) in which periodic events occur, it becomes possible to reduce signaling overload occurring in the MME, S-GW, or P-GW that manages the outskirts of the area into which users are abruptly crowded and to enable the UE in the congested area to maintain the service quality over a predetermined level through allocation of a specific S-GW or P-GW to the UE in the corresponding area through the specific MME.

Further, through temporary addition of an MME, S-GW, or P-GW to a specific area, it is possible to make a mobile communication network in normal conditions and a mobile communication network in specific situations operate in different manners. For example, by adding the MME, S-GW, or P-GW around the World Cup Stadium during the period in which the World Cup is held, a high-quality LTE service can be provided. Since it may be inefficient in network management and cost to install and maintain network equipment constantly and usually in a retired place, the above-described scenario has efficiency.

Further, according to this embodiment, in order to support mobility to a connected UE, in the case where the connected UE moves to a new TAC, the eNB may grasp whether the new TAC is related to the same MMEGI of the existing TAC, and if the new TAC is related to another MMEGI, the eNB may perform an intra-eNB inter-MME handover. If the new TAC is a TAC that is related to the same MMEGI, the eNB performs an intra-eNB handover, and in this case, only RRC information between the eNB and the UE is changed, and control information exchange with the MME may be skipped.

Further, although being examined thoroughly later, when the intra-eNB inter-MME handover according to this embodiment is performed, control messages or parameters may be partially saved since the target eNB and the source eNB are the same unlike the existing inter-MME handover. Further, it can be recognized that the currently initiated handover procedure is an intra-eNB inter-MME handover through a change of the existing parameter values.

Hereinafter, in a situation as shown in FIG. 4, a method for managing mobility of UE is proposed. If the UE moves to another cell in a state where the UE is connected to the eNB, the eNB initiates a handover procedure if the eNB considers it is more suitable for connectivity that the UE receives a service from another cell. In general, if another cell belongs to another eNB, an inter-eNB handover is performed. If another cell to which the UE intends to move belongs to the same eNB, an intra-eNB handover is performed. However, in consideration of the problem to be solved by the present disclosure, in the case where the UE moves to a cell which belongs to the same eNB, but belongs to a TA that is managed by another MME pool, it is required to transfer context of the UE from an MME (source MME) that has managed the UE in a source TA to a target MME that manages a target TA when the handover is performed. Accordingly, an inter-MME handover is required.

For example, referring to FIG. 4, since the UE moves from a cell that belongs to TA 1 465 to a cell that belongs to TA 2 470, an inter-MME handover is required. In the present disclosure, a case where the UE moves within the same eNB 435, but UE context exchange between MMES is necessary is called an intra-eNB inter-MME handover. Further, since the handover uses S1 interface, it may be called an intra-eNB S1 handover. This is not limited to the title, but means a method that includes a procedure for exchanging UE context between MMES during the handover procedure in the case where the UE moves within logically the same eNB and the target MME that supports the area to which the UE has moved is different from the source MME. As described above, the UE context may include UE identifier and bearer related information (QoS, bearer ID, and S-GW address) that is being provided to the UE.

Figure 5:
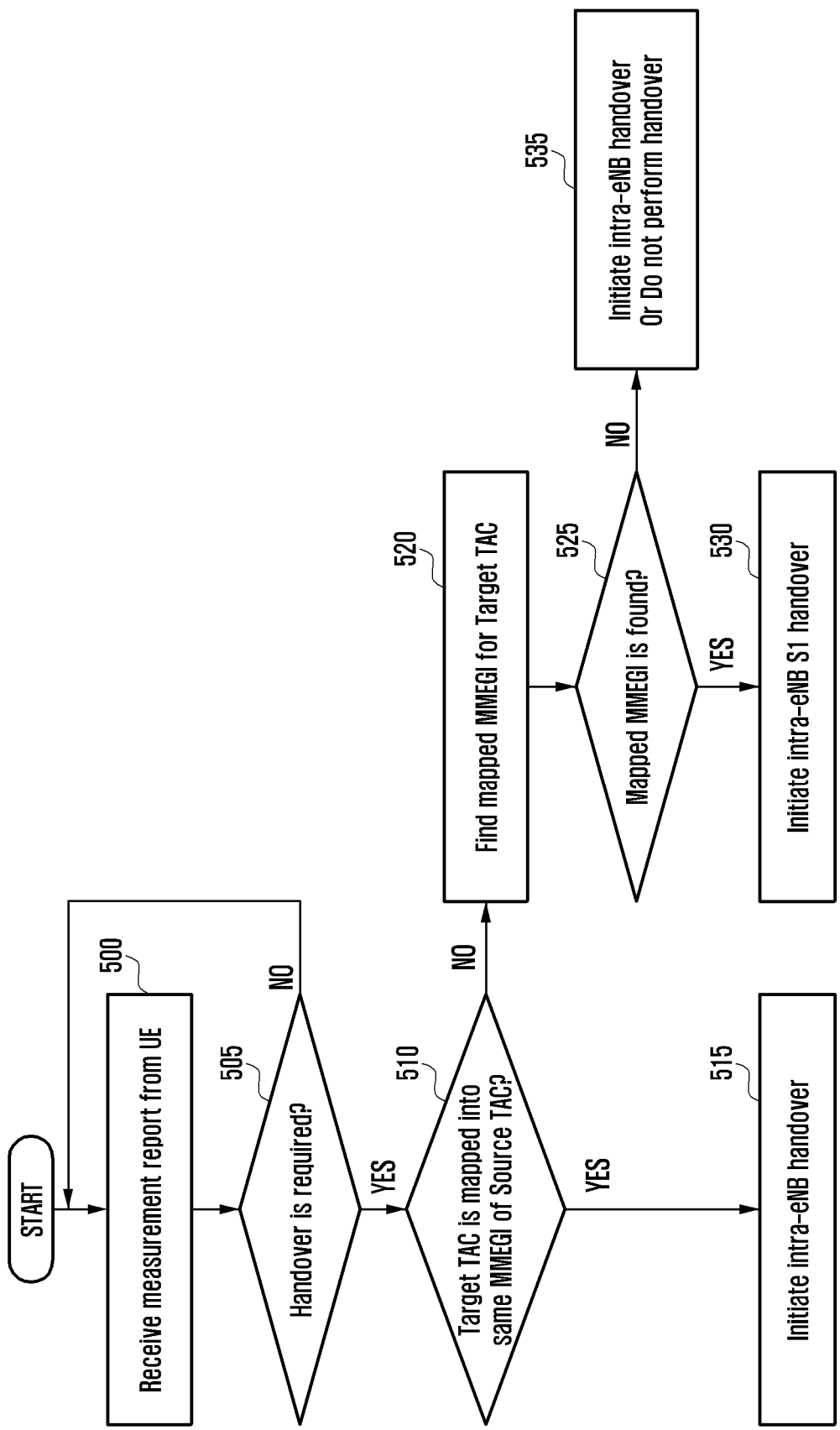
FIG. 5 illustrates decision of whether to perform an intra-eNB inter-MME handover when an eNB senses mobility of connected UE and decides a handover according to an embodiment of the present disclosure.

FIG. 5 illustrates decision of whether an intra-eNB inter-MME handover is necessary through an eNB (e.g., 435).

At operation 500, the eNB receives a measurement report from the UE in order to grasp mobility of the UE.

At operation 505, the eNB may decide whether a handover is required. For example, the eNB may decide whether the handover is required in accordance with a carrier frequency that is included in the measurement report or information related to strength of a radio signal that is received from a serving cell and strength of a radio signal that is received from a neighbor cell.

The eNB, which has decided that the handover is necessary, performs a procedure to confirm TAC and MMEGI according to an embodiment of the present disclosure. The eNB can know TAC information of the source cell and the MMEGI that is mapped into the source TAC since the eNB has performed the S1 setup.

At operation 510, the eNB confirms whether the TAC of the target cell is mapped into the MMEGI that is mapped into the source TAC. As an example, the mapping information of the target TAC and the source TAC may be simultaneously confirmed. If the target TAC is mapped into the MMEGI that is mapped into the source TAC, the eNB, at operation 515, decides that the UE moves into an area in which the same MME pool provides a service, and performs an intra-eNB handover.

If the target TAC is not mapped into the MMEGI that is mapped into the source TAC, the eNB, at operation 520, decides that the UE moves to an area in which another non-overlapping MME pool provides a service. At operation 520, the eNB searches for the MMEGI that is mapped into the target TAC. As an example, the eNB can confirm the source MMEGI through the source TAC, and can confirm whether the mapping result between the confirmed source MMEGI and target TAC exists. If the mapping result exists, the eNB may decide that the source TAC and the target TAC are served by the same MME pool. If the mapping result does not exist, the eNB decides that the source TAC and the target TAC are served by another MME pool, and then may search for the MMEGI for the target TAC.

At operation 525, the eNB may decide whether to confirm the MMEGI that is mapped into the target TAC.

If there is the MMEGI that is mapped into the target TAC, the eNB, at operation 530, may perform an intra-eNB inter-MME handover to exchange terminal context between the MME that is in the corresponding MMEGI and the source MME.

In contrast, if the MMEGI that is mapped into the target TAC is not found in the decision process, the eNB, at operation 535, may perform only the intra-eNB handover or may not perform the handover. In the case where the eNB has performed the intra-eNB handover in the above-described situation, the UE updates a tracking area after completion of the handover, and if a rejection is received against the tracking area update, the UE may attempt to registration again in the mobile communication network through attachment after detachment or new tracking area update. If the handover is not performed in the above-described situation, the UE performs communication until a radio link is disconnected, and if the radio link is disconnected, the UE may attempt RRC connection to the eNB again.

On the other hand, as another example, instead of the procedure for determining whether the MMEGI of the source TAC is mapped into the target TAC, the eNB may perform another decision procedure as follows. The eNB knows TAC information of the target cell to which the UE is to perform a handover, and can confirm the MMEGI that is mapped into the target cell in accordance with the S1 setup according to an embodiment of the present disclosure. If the MMEGI that is mapped into the target TAC is the same as the MMEGI that is mapped into the source TAC, the eNB may decide that the UE moves into an area in which the same MME pool provides a service, and may perform the intra-eNB handover. If the MMEGI that is mapped into the target TAC is different from the MMEGI that is mapped into the source TAC, the eNB may decide that the UE moves into an area in which another non-overlapping MME pool provides a service. The eNB that has decided as described above may perform the intra-eNB inter-MME handover.

Figure 6:
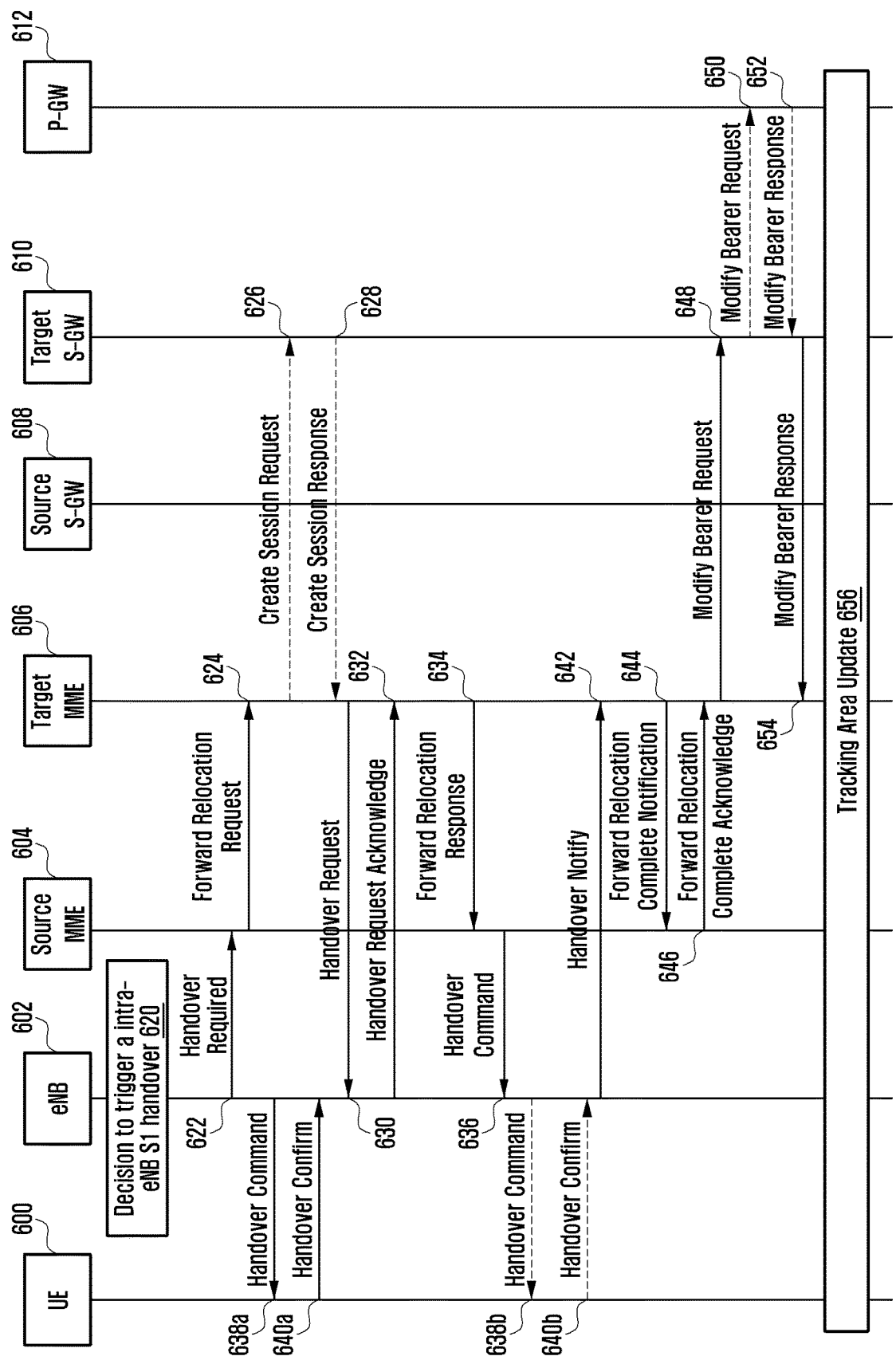
FIG. 6 illustrates a method and a procedure for performing an intra-eNB inter-MME handover in a wireless communication system according to an embodiment of the present disclosure.

FIG. 6 illustrates a method and a procedure for performing an intra-eNB inter-MME handover in a wireless communication system according to an embodiment of the present disclosure.

At operation 620, an eNB 602 decides a handover in accordance with a measurement report that is transmitted by connected UE. In this case, in the same method as that according to the embodiment of FIG. 5, the eNB may decide whether to trigger an intra-eNB inter-MME handover. An intra-eNB S1 handover and an intra-eNB inter-MME handover are used to have the same meaning.

At operation 622, the eNB 602 that has decided the intra-eNB inter-MME handover transmits a "handover required" message to a source MME 604. The eNB 602 includes a "source to target container" information element in the "handover required" message. "Source to target transparent container" is a wireless information element of the UE that a source eNB transfers to a target eNB during the handover, for example, an information element that exists to contain radio information or RRC information of the UE 600, and the MME forwards the information element to the target eNB as it is without reading the information element.

An embodiment of the present disclosure proposes a method for differently constructing the "source to target transparent container". Since the handover to be performed is an intra-eNB handover, the eNB 602 can internally process radio and RRC related information without the necessity of transferring the "source to target transparent container" information to the target eNB. Accordingly, processing for constructing the "source to target transparent container" is not necessary, and a null value may fill therein. Further, a specific code value may fill the "source to target transparent container". For example, a value that is defined by a mobile communication network operator may fill in a part of the whole length or the whole bits.

The "source to target transparent container" that is filled with the null or specific code value is transferred to the source MME 604, and at operation 630, it is included in a "handover request" message through a target MME 606 in the source MME 604 to be transferred again to the eNB 602.

The eNB 602, which has received the "handover request" message, grasps information contained in the "source to target transparent container" information element in the message through processing of the information element. The eNB 602 can confirm whether the information contained in the information element is the null or specific code value. Through this, the eNB 602 may decide that the corresponding handover request is the intra-eNB inter-MME handover that is initiated by the eNB itself.

As another embodiment, the eNB 602 may not confirm whether internal data is the null or specific code through processing of the "source to target transparent container" every time. In other words, without using the method for determining whether the "source to target transparent container" has the null or specific code value every time, the eNB 602 may confirm the contents through processing of the information element, and if non-understandable contents are included to cause an error occurrence, the eNB 602 may grasp whether the corresponding contents correspond to the intra-eNB inter-MME handover that is initiated by the eNB itself through confirmation of whether the corresponding contents are the null or specific code values.

As another method, the eNB 602 may construct the "source to target transparent container" so as to include the existing radio and RRC information. The eNB 602, which has received the "source to target transparent container" through the "handover request" message at operation 630, processes the information contained in the corresponding information element, and can know that the source eNB of the UE 600 that performs the handover is the eNB itself in accordance with a UE history information element included in the information element. The UE history information element has mobility information of the UE 600, that is, list information about in which cell the UE 600 existed in the past. The eNB 602 that has confirmed this may disregard the information included in the "source to target transparent container" or may use the information for the subsequent handover operation according to the corresponding information.

At operation 622, the source MME 604 receives the "handover required" message, and confirms whether the "handover required" message corresponds to an intra-LTE handover through confirmation of the handover type. Further, the source MME 604 grasps what MME the "handover required" message should be connected to through confirmation of the target ID of the "handover required" message. Thereafter, at operation 624, the source MME 604 constructs a forward relocation request message and transfers the constructed forward relocation request message to the target MME 606.

The target MME 606 may confirm bearer context, mobility related context, and information on S-GW, which were provided to the UE 600, in accordance with the forward relocation request message. Based on this, the target MME 606 may decide whether to establish bearer connection with new S-GW. If it is decided that S-GW change is necessary, the target MME 606, at operation 626, may request session creation from a target S-GW 610 through a "create session request" message. At operation 628, the target S-GW 610 responds to this through a "create session response" message. The target MME 606 establishes the bearer connection to be transmitted by the UE 600 after the handover between the eNB 602 and the target S-GW 610.

On the other hand, when performing the handover, the eNB 602 may perform direct forwarding and indirect forwarding. The direct forwarding and the indirect forwarding are functions that are used to forward downlink data or uplink data to the UE 600 that performs the handover.

While the handover is performed, the UE 600 is connected to the eNB 602 again after being disconnected from the eNB 602, and the target eNB may receive data that is transferred to the UE 600 through setting of a direct forwarding path or an indirect forwarding path to prevent a loss of the data to be transferred to the UE 600. In the case where the UE 600 has sent the uplink data to the source eNB, the source eNB can also process the corresponding uplink data through forwarding of the uplink data to the eNB.

As an embodiment related to this, when the eNB 602 constructs the "handover required" message at operation 622, the eNB 602 can set a "direct forwarding path availability" information element to "true". Accordingly, the eNB 602 and the MME may operate not to use the indirect data forwarding for the uplink/downlink data of the UE. This may cause signaling between the MME and the S-GW for supporting the indirect data forwarding of a general handover not to be performed, and thus processing and signaling overhead can be reduced.

Although the eNB 602 has set the direct forwarding path availability to "true", the handover is the intra-eNB 602 handover, and thus the eNB 602 does not directly forward data to another eNB, but internally processes the downlink data or uplink data of the UE 600. Accordingly, in the general handover procedure, messages and procedures that are performed for the direct forwarding may be skipped.

For example, an eNB status transfer message that the source eNB sends to the source MME may be skipped. In general, this message includes information on the PDCP sequence number or HFN status of data that is sent or received by the UE. The Packet Data Convergence Protocol (PDCP) is one of wireless traffic stack layers, and is a protocol for transmission of user data, which performs IP header compression and compression release. The Hyper Frame Number (HFN) is a sequence number that is used to be extended to the next sequence number when the PDCP sequence number reaches the maximum value. In an embodiment of the present disclosure, since the sequence for user's data transfer packets can be processed within the eNB 602, the eNB status transfer message may be skipped.

On the other hand, the eNB 602 may also send the eNB status transfer to the source MME 604, and the source MME 604 that has received this may transfer a message that includes the PDCP SN and the HFN to the target MME 606 as forward access context notification. Accordingly, the target MME 606 constructs and transmits an MME status transfer message to the target eNB, and information that is contained in the eNB status transfer may be included in the MME status transfer message. In this embodiment, since the source eNB and the target eNB are the same, the eNB 602 may disregard the received MME status transfer and may process the packet order within the eNB 602. Further, the eNB 602 may process the packet order in accordance with the information contained in the MME status transfer.

At operation 632, the eNB 602 transfers a "handover request acknowledge" message to the target MME 606. The "handover request acknowledge" message includes a "target to source transparent container" information element. The "target to source transparent container" information element includes a wireless information element of the target eNB that the target eNB sends to the source eNB, for example, radio and RRC information, and this is information to be used for the UE in the target eNB. That is, the source eNB sends a handover command to the UE using the radio and RRC information contained in the target to source transparent container, and the UE may make RRC connection with the target eNB based on the radio and RRC information.

In this embodiment of the present disclosure, since the handover is the intra-eNB handover, the source eNB and the target eNB are the same, and the "target to source transparent container" information element may be filled with null values or specific code values. For example, the whole bits may be filled with null, or a part of the whole length or the whole bits may be filled with values defined by a mobile communication network operator. At operation 634, the target MME 606 that has received the "handover request acknowledge" message as constructed above transfers a forward relocation response message to the source MME 604 in response to the operation 624, and this message includes a target to source transparent container.

At operation 636, the source MME 604 includes the target to source transparent container that is included in the received message in a handover command message and transmits the handover command message to the eNB 602. The eNB 602, which has received the handover command, grasps information contained in the "target to source transparent container" information element in the message through processing of the information element. The eNB 602 confirms whether the information contained in the information element is the null or specific code value. Through this, the eNB 602 may decide that the corresponding handover request is the message caused by the intra-eNB inter-MME handover that is initiated by the eNB itself.

As another embodiment, the eNB 602 may not use the method for confirming internal data through processing of the "target to source transparent container" every time. For example, without confirming whether the "target to source transparent container" has the null or specific code value every time, the eNB 602 may confirm the contents through processing of the "target to source transparent container" information element, and if non-understandable contents are included therein, the eNB 602 may cause an error to occur. In this case, the eNB 602 may grasp whether the corresponding contents correspond to the intra-eNB inter-MME handover that is initiated by the eNB itself through confirmation of whether the corresponding contents are the null or specific code values.

As another method, the eNB 602 may construct the "target to source transparent container" so as to include the existing radio and RRC information. That is, the eNB 602 may construct a "handover request acknowledge" message to include the "target to source transparent container" and the radio and RRC information. At operations 634 to 636, the eNB 602, which has received the "target to source transparent container" through the handover command that is transmitted by the source MME 604, may use the corresponding information in the subsequent handover operation.

The eNB 602 includes an E-RABs admitted list in the "handover request acknowledge" message that is transmitted at operation 632. The E-RABs admitted list contains established bearer information that the eNB 602 provides to the UE 600 that performs the handover. The E-RABs admitted list includes DL transport layer address, DL GTP-TEID, UL transport layer address, and UL GTP-TEID parameters, and is information on data forwarding to prevent a data loss when the handover is performed. In this embodiment, the data forwarding may not be performed, and thus the parameters may be skipped from the constituent elements of the E-RABs admitted list.

The source MME 604 includes an "E-RABs subject to forwarding list" in the "handover command" message transmitted at operation 636. The "E-RABs subject to forwarding list" includes bearer information that the source eNB should establish for the data forwarding. The E-RABs subject to forwarding list includes DL transport layer address, DL GTP-TEID, UL transport layer address, and UL GTP-TEID parameters. In this embodiment, the data forwarding may not be performed, and thus the parameters may be skipped from the constituent elements of the E-RABs subject to forwarding list. The eNB 602 internally processes the data forwarding.

At operation 638*b*, the eNB 602 may transmit the handover command message to the UE 600 after receiving the handover command message from the source MME 604 at operation 636.

On the other hand, in this embodiment, since the intra-eNB handover is handled, wireless connection (radio link or RRC) between the UE 600 and the eNB 602 may be internally processed by the eNB 602, and procedures among the eNB 602, the source MME 604, and the target MME 606 may be performed independently of the wireless connection of the UE 600. In other words, the eNB 602 may transmit the "handover command" message to the UE 600 at operation 638*a* just after it sends the "handover required" message to the source MME 604 at operation 622.

The "handover command" message at operation 638*a* or 638*b* may include wireless resource information for connection to the eNB 602 in the target cell to which the UE 600 is to move, or RRC information. Since the handover is the intra-eNB handover, the eNB 602 may construct the wireless resource information for connection to the eNB 602 in the target cell and the RRC information for itself. The RRC information may include C-RNTI for identifying the UE 600 in the cell, DRB ID that is a bearer ID to be used by the UE 600, and information on a security algorithm to be used by the UE 600 and the eNB 602.

After receiving the handover command, the UE 600 is connected to the eNB 602 again using the wireless resource information or RRC information included in the message. That is, the UE 600 performs an RRC connection reconfiguration procedure. After newly establishing the RRC connection (or reconfiguration), the UE 600 transfers a "handover confirm" message to the target eNB 602 (in this embodiment, the source eNB and the target eNB are the same) at operation 640*a* or 640*b* to notify that the UE 600 is well connected to the eNB 602 in the cell to which the UE 600 has moved.

Since the UE 600 has established the RRC connection with the eNB 602 in the target cell, the eNB 602 may transmit downlink data to the UE 600, or may receive uplink data from the UE 600. Further, the eNB 602 may transfer the uplink data between the UE and the S-GW after it receives uplink bearer information that is connected between the eNB and the S-GW from the target MME 606. The downlink data is transferred using the existing bearer that is connected between the eNB and the S-GW, and is transferred through a new bearer after downlink TEID between the new eNB and the S-GW is exchanged through a "modify bearer request" that is transmitted at operation 648.

If the eNB transmits the "handover command" message to the UE 600 at operation 638*b* just after it sends the "handover required" message to the source MME 604, the eNB 602, the source MME 604, and the target MME 606 send/receive messages for UE context exchange and bearer information establishment independently when the RRC connection to the target cell is established in accordance with the "handover command" message transmitted by the UE 600. Various embodiments of the present disclosure may include that the eNB 602 transmits the "handover command" message to the UE at operation 638*a* after receiving the "handover request" message from the target MME 606 at operation 630. In other words, the eNB 602 may perform a handover of an RRC level between the eNB 602 and the UE 600 through transfer of the handover command to the UE 600 before receiving the handover command from the source MME 604 at operation 636.

As described above, in the case where the eNB 602 performs the handover command procedure at operation 638*a* with respect to the UE 600 before it receives the handover command at operation 636, the eNB 602 may not perform a process in accordance with the message after receiving the "handover command" message at operation 636 since the eNB 602 has already sent the handover command to the UE 600. Further, the eNB 602 may not process the contents of the "target to source transparent container" information element that is included in the "handover command" message at operation 636.

On the other hand, the eNB 602 may receive a "handover preparation failure" message from the source MME 604 without receiving the "handover command" message at operation 636. In this case, the source MME 604 has decided that the handover has failed, and thus the eNB 602 cannot perform the handover. However, since the handover command has already been transferred to the UE 600, it is necessary for the eNB 602 to take proper measures with respect to the UE 600.

As a method according to this, the eNB 602 may maintain the current RRC connection to the UE 600 as it is, or may return to the RRC connection state before it transfers the "handover command" message. In order to return the newly established RRC connection to the previous RRC connection after receiving the "handover command" message, the UE 600 may perform an RRC connection reestablishment or an RRC connection reconfiguration. Further, the eNB 602 may construct the "handover command" message as the RRC information that suits the source cell to transfer the "handover command" message to the UE 600 again. The UE 600 that has received the "handover command" message may reestablish the RRC connection with the radio and RRC information included in the message.

The eNB 602 according to the present disclosure may not transmit the "handover command" message just after sending the "handover required" message at operation 622, but may transmit the message after transmitting the handover command at operation 636 in a state where a negotiation procedure between the source MME 604 and the target MME 606 is completed.

The eNB 602 transfers a "handover notify" message to the target MME 606 at operation 642 after receiving the "handover confirm" message from the UE 600 at operation 640*a* or 640*b*. This message means that the UE 600 has completed the handover, and the target MME 606 that has received the message transfers a "forward relocation complete notification" message to the source MME 604 at operation 644. Further, the source MME 604 transfers the "forward relocation complete notification" message to the target MME 606 at operation 646.

The target MME 606, which decides that the handover has been successfully performed, sends a modify bearer request to the S-GW 610 at operation 648 and transfers a downlink TEID allocated by the eNB 602 to establish a bearer path. Although FIG. 6 expresses that the message is sent to the target S-GW 610, the modify bearer request may be transferred to the source S-GW 608 if the S-GW is not changed. If necessary, the S-GW 610 performs the modify bearer request with the P-GW 612 at operation 650 and 652. In operation 625, the P-GW 612 sends the modify bearer response 654 to the target MME 606.

The UE 600 that has completed the handover informs a mobile communication network of TA of a newly camping cell through performing of the tracking area update at operation 656.

As still another embodiment, although the inter-MME handover is necessary, the eNB 602 may not perform the inter-MME handover, but may newly make an RRC connection through a cell change with the UE 600 through the intra-eNB handover to complete the handover procedure. Since the TA has been changed, the UE 600 performs a tracking area update after completion of the handover, and in this case, the eNB 602 sends the tracking area update to the target MME 606 in accordance with the TA to which the corresponding UE 600 belongs.

Since the inter-MME handover is not performed, the target MME 606 does not have information on the UE 600, and cannot acquire the information through negotiation with the source MME 604. Accordingly, the target MME 606 may send "rejection" in response to the tracking area update that is requested by the UE 600, and the UE 600 performs disconnection to newly perform a tracking area update or registration again in the target MME 606 through performing of attachment.

Figure 7:
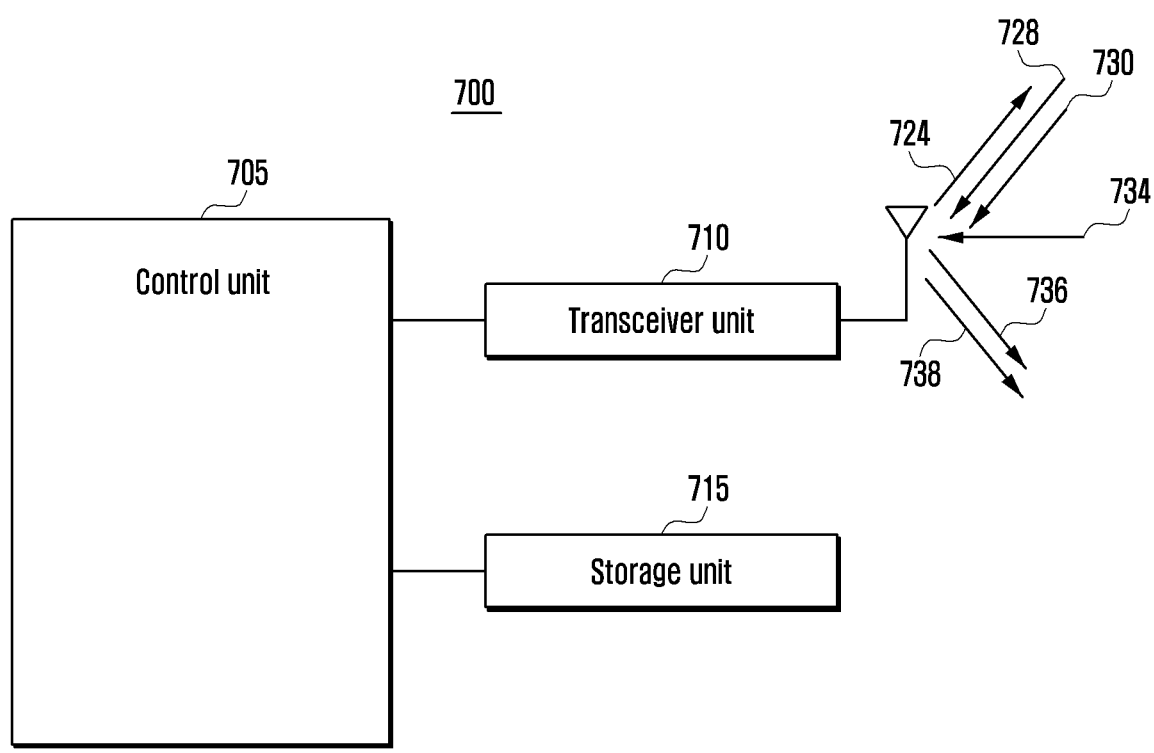
FIG. 7 illustrates the schematic configuration of an eNB according to an embodiment of the present disclosure.

FIG. 7 illustrates the schematic configuration of an eNB (e.g., 602) according to an embodiment of the present disclosure.

Referring to FIG. 7, an eNB 700 may include a control unit 705, a transceiver unit 710, and a storage unit 715.

The transceiver unit 710 may transmit/receive signals by wire or wirelessly with UE or an entity of a core network (e.g., MME or S-GW). The transceiver unit 710 may include, for example, a plurality of RUs.

The control unit 705 may perform the overall operation of the eNB 700 according to an embodiment of the present disclosure. The control unit 705 may include a DU of the eNB.

According to an embodiment, the control unit 705 may set a tracking area supported by the eNB, mobility management entities, and related information between mobility management entity pools including the mobility management entities. Further, the control unit 705 may transmit an interface setup request message 724 that is related to the tracking area to the mobility management entity pool 726 that is related to the tracking area on the basis of the set related information. Further, the control unit 705 may operate to receive an interface setup response message 728 related to the tracking area from the mobility management entity pool 726. The control unit 705 may store identification information of the tracking area and mapping information between identification information of the mobility management entity pools included in the interface setup response message in the storage unit 715.

According to another embodiment, the control unit 705 may transmit the interface setup request message 724 related to the tracking area supported by the eNB to the mobility management entity pool, and may confirm whether the interface setup response message related to the tracking area is received from the mobility management entity pool 726. Further, if the interface setup response message 728 is received, the control unit 705 may store mapping information between the tracking area and the mobility management entity pool in the storage unit 715. For example, the control unit 705 may store the identification information of the tracking area and the mapping information between the identification information of the mobility management entity pools. If an "interface setup failure" message 730 is received in response to the interface setup request message 724 related to the tracking area, the control unit 705 may operate to transmit the interface setup request message 724 related to the tracking area to another mobility management entity pool.

In various embodiments of the present disclosure, the control unit 705 may receive a connection request message 734 from the UE, confirm the identification information of the tracking area that corresponds to a cell to which the UE requests the connection, and acquire the identification information of the mobility management entity pool that is mapped into the identification information of the tracking area that corresponds to the cell.

Further, the control unit 705 decides that the handover is demanded for the target cell managed by the eNB 700 on the basis of the measurement information received from the UE, confirms whether the mobility management entity pools that are mapped into the tracking areas of the target cell and the source cell on the basis of the mapping information, and decides whether to perform the mobility management entity pool change during the handover on the basis of the result of the confirmation.

Further, if it is decided to perform the mobility management entity pool change during the handover, the control unit 705 may operate to transmit a "handover required" message 736 for setting a wireless information element to a null value or a certain code value to the source mobility management entity pool.

Further, if it is decided to perform the mobility management entity pool change during the handover, the control unit 705 may operate to transmit a "handover required" message 738 for setting a "data direct forwarding availability indication" information element of the target eNB to an activation value to the source mobility $_{[41]}$ management entity pool, and may skip the eNB status transfer message transmission.

Further, if it is decided to perform the mobility management entity pool change during the handover, the control unit 705 may operate to transmit a "handover request acknowledge" message for setting a wireless information element of the target eNB to a null value or a certain code value in response to the reception of the "handover request" message that is transmitted by the target mobility management entity.

Further, if it is decided to perform the mobility management entity pool change during the handover, the control unit 705 may operate to transmit a handover command to the UE before handover execution is instructed by the source mobility management entity, and to transmit a message for reconnecting the UE to the source cell to the UE if the handover execution is not instructed by the source mobility management entity and the "handover preparation failure" message is received.

The operations of the eNB as described above may be implemented by providing a memory device that stored corresponding program codes in a certain configuration unit of the eNB device. That is, the control unit of the eNB may execute the above-described operations through reading and executing the program codes stored in the memory device by a processor or a Central Processing Unit (CPU).

Entities explained in the description, for example, various constituent units of the eNB and modules may be operated using a hardware circuit, for example, a complementary metal oxide semiconductor based logic circuit, firmware, software and/or hardware and firmware and/or a hardware circuit such as a combination of software inserted into a machine readable medium. As an example, various electrical structures and methods may be embodied using transistors, logic gates, and electrical circuits such as custom semiconductor.

Although the present disclosure has been described with embodiments, various changes and modifications may be suggested to one skilled in the art. It is intended that the present disclosure encompass such changes and modifications as fall within the scope of the appended claims.

What is claimed is:

1. A method for a base station to perform communication in a wireless communication system, the method comprising:

transmitting an interface setup request message including first tracking area information to at least one mobility management entity (MME) in a first MME pool;

receiving, from the at least one MME in the first MME pool, a message in response to the interface setup request message;

in response to the message being an interface setup response message including identification information of the first MME pool corresponding to the first tracking area information, storing mapping information between the first tracking area information and the identification information of the first MME pool;

in response to the message being an interface setup failure message, transmitting the interface setup request message including the first tracking area information to at least one MME in a second MME pool;

identifying that tracking area information for a terminal is changed from the first tracking area information served by the base station to second tracking area information served by the base station;

determining a handover from at least one MME in the first or second MME pool to at least one MME in a third MME pool, in response to identifying that an MME pool corresponding to the second tracking area information is different from the first or second MME pool corresponding to the first tracking area information based on the stored mapping information, wherein context information of the terminal is transmitted from the at least one MME in the first or second MME pool to the at least one MME in the third MME pool.

2. The method of claim 1, wherein the mapping information is associated with the tracking area information for the terminal, identification information of the at least one MME and the identification information of the first MME pool.

3. The method of claim 2, further comprising:
receiving a connection request message from the terminal;
identifying the tracking area information for the terminal that corresponds to a cell to which connection is requested by the terminal; and
acquiring identification information of an MME pool that is mapped into the tracking area information for the terminal and corresponding to the cell based on the stored mapping information.

4. The method of claim 2, further comprising determining that the handover is required to a target cell that is managed by the base station based on measurement information that is received from the terminal.

5. The method of claim 4, further comprising:
identifying whether MME pools that are mapped into tracking area information of the target cell and a source cell are the same based on the mapping information; and
determining to perform a change of the MME pools during the handover based on a result of the identification that the MME pools that are mapped into the tracking area information of the target cell and the source cell are the same.

6. A base station comprising:
a transceiver; and
a controller coupled with the transceiver and configured to:
control the transceiver to transmit an interface setup request message including first tracking area information to at least one mobility management entity (MME) in a first MME pool,
control the transceiver to receive, from the at least one MME in the first MME pool, a message in response to the interface setup request message,
in response to the message being an interface setup response message including identification information of the first MME pool corresponding to the first tracking area information, control to store mapping information between the first tracking area information and the identification information of the first MME pool, in response to the message being an interface setup failure message, control the transceiver to transmit the interface setup request message including the first tracking area information to at least one MME in a second MME pool, identify that tracking area information for a terminal is changed from the first tracking area information served by the base station to second tracking area information served by the base station, and determine a handover from at least one MME in the first or second MME pool to at least one MME in a third MME pool, in response to identifying that an MME pool corresponding to the second tracking area information is different from the first or second MME pool corresponding to the first tracking area information based on the stored mapping information, wherein context information of the terminal is transmitted from the at least one MME in the first or second MME pool to the at least one MME in the third MME pool.

7. The base station of claim 6, wherein the mapping information is associated with the tracking area information for the terminal, identification information of the at least one MME and the identification information of the first MME pool.

8. The base station of claim 7, wherein the controller is further configured to control to
receive a connection request message from the terminal,
identify the tracking area information for the terminal that corresponds to a cell to which connection is requested by the terminal, and
acquire identification information of an MME pool that is mapped into the tracking area information for the terminal and corresponding to the cell based on the stored mapping information.

9. The base station of claim 7, wherein the controller is further configured to determine that the handover is required to a target cell that is managed by the base station based on measurement information that is received from the terminal.

10. The base station of claim 9, wherein the controller is further configured to
identify whether MME pools that are mapped into tracking area information of the target cell and a source cell are the same based on the mapping information, and
determine to perform a change of the MME pools during the handover based on a result of the identification that the MME pools that are mapped into the tracking area information of the target cell and the source cell are the same.

11. A non-transitory computer readable medium embodying a computer program, the computer program comprising computer readable program code that, if executed by a processor, causes a base station to:
transmit an interface setup request message including first tracking area information to at least one mobility management entity (MME) in a first MME pool;
receive, from the at least one MME in the first MME pool, a message in response to the interface setup request message;
in response to the message being an interface setup response message including identification information of the first MME pool corresponding to the first tracking area information, store mapping information between the first tracking area information and the identification information of the first MME pool;
in response to the message being an interface setup failure message, transmit the interface setup request message including the first tracking area information to at least one MME in a second MME pool;
identify that tracking area information for a terminal is changed from the first tracking area information served by the base station to second tracking area information served by the base station; and
determine a handover from at least one MME in the first or second MME pool to at least one MME in a third MME pool, in response to identifying that an MME pool corresponding to the second tracking area information is different from the first or second MME pool corresponding to the first tracking area information based on the stored mapping information,
wherein context information of the terminal is transmitted from the at least one MME in the first or second MME pool to the at least one MME in the third MME pool.

12. The non-transitory computer readable medium of claim 11, wherein the mapping information is associated with the tracking area information for the terminal, identification information of the at least one MME and the identification information of the first MME pool.

13. The non-transitory computer readable medium of claim 12, wherein the computer program further comprises computer readable program code that, if executed by the processor, causes the base station to:
receive a connection request message from the terminal;
identify the tracking area information for the terminal that corresponds to a cell to which connection is requested by the terminal; and
acquire identification information of an MME pool that is mapped into the tracking area information for the terminal and corresponding to the cell based on the stored mapping information.

14. The non-transitory computer readable medium of claim 12, wherein the computer program further comprises computer readable program code that, if executed by the processor, causes the base station to:
determine that the handover is required to a target cell that is managed based on measurement information that is received from the terminal;
identify whether MME pools that are mapped into tracking area information of the target cell and a source cell are the same based on the mapping information; and
determine to perform a change of the MME pools during the handover based on a result of the identification that the MME pools that are mapped into the tracking area information of the target cell and the source cell are the same.

* * * * *